3,313,856
PREPARATION OF ACROLEIN OR
METHACROLEIN
Bernard Phielix, Sittard, and Jentje Bonnema, Geleen,
Netherlands, assignors to Stamicarbon N.V., Heerlen,
Netherlands
No Drawing. Filed Oct. 15, 1962, Ser. No. 230,700
Claims priority, application Netherlands, Mar. 6, 1961,
262,006; Jan. 12, 1962, 273,489; July 6, 1962, 280,678
9 Claims. (Cl. 260—604)

This application is a continuation-in-part of Ser. No. 176,922, filed Mar. 2, 1962 and now abandoned.

The present invention relates to a process for the preparation of acrolein or methacrolein by catalytic oxidation of propene or isobutene with an oxygen-containing gas, in the gas phase at elevated temperatures.

Several catalysts or catalyst systems are already known for use in the above oxidation reaction. Some catalysts which have been mentioned for this purpose are, for example, metal selenites and tellurites, in particular silver selenite; the oxides of copper or silver or other compounds of these metals in the presence of elementary selenium; cuprous oxide-containing masses, with or without a promoter such as iodine; bismuth molybdates and/or phosphomolybdates; tungstates of silver, tin and/or bismuth; and cobalt molybdates. Belgian Patent 587,685 discloses the use of catalysts containing antimony oxide, alone or in combination with other metal oxides, such as the oxides of molybdenum, tungsten, tellurium, copper, titanium, cobalt and especially tin. The preferred catalyst contains tin antimonates, and it is also stated that the catalysts are by preference used in the oxidation of propene.

It has now been found that mixtures and/or compounds comprising the oxides of antimony and vanadium or the oxides of antimony, vanadium and phosphorus are useful catalysts with excellent activity and specificity for the oxidation reaction mentioned above. Thus, according to the present invention, there is provided a process for the preparation of acrolein or methacrolein by the gas phase oxidation of propene or isobutene with an oxygen-containing gas at an elevated temperature and in the presence of a catalyst containing antimony, the process being characterized by the use of a catalyst comprising a mixture and/or compound of the oxides of antimony and vanadium or of antimony, vanadium and phosphorus.

Particularly suitable catalysts for use in the present process are those having a composition such that the antimony component is present in an amount at least equal to the stoichiometric amount, i.e. the amount corresponding to the formula $Sb(VO_3)_3$ or $SbPO_4$, respectively.

The activity of the present catalyst can be further increased by including a bismuth oxide therein. To this end, the composition of the catalyst is preferably such that both the antimony and the bismuth components are present in at least stoichiometric amounts. In this connection, it should be noted that the "stoichiometric amount" of the bismuth component is considered to be the amount corresponding to the formula $Bi(VO_3)_3$ or $BiPO_4$, respectively.

The present process offers a number of advantages over the process set forth in the Belgian patent mentioned above. Thus, for example, the present process makes possible considerably higher yields of methacrolein. The advantages of the process according to the invention are also apparent from the high daily production which can be obtained per liter of catalyst.

In addition to acrolein and methacrolein, smaller amounts of other valuable by-products are formed in the process, namely, acetaldehyde in the oxidation of propene, and methacrylic acid in the oxidation of isobutene.

In general, best results are obtained in these oxidation reactions if the composition of the catalysts is such that the atomic ratio between antimony, or the sum of the antimony and any bismuth present, on the one hand and vanadium, or the sum of the vanadium and phosphorus if any, on the other hand, is at least 0.5, but not more than 1.5. Accordingly, it is preferred to to use catalysts having this composition. If catalysts are used in which the indicated atomic ratio is lower than 0.5, both the degree of conversion into acrolein, or methacrolein, and the yield are low. On the other hand, if catalysts with an atomic ratio higher than 1.5 are used, the yield is generally satisfactory, but the degree of conversion is low.

Catalysts according to the invention which contain mixtures and/or compounds of both vanadium and phosphorus oxides are preferably composed in such a way that the atomic ratio between vanadium and phosphorus is at least 3. If the catalysts contain mixtures and/or compounds derived from bismuth in addition to mixtures and/or compounds derived from antimony, the atomic ratio between antimony and bismuth may be varied between wide limits, e.g. between 0.1 and 10.

The catalyst described herein can be prepared by intimately mixing the desired components, with or without a carrier material. The resulting mixture, if desired, may be processed into granules or tablets. Preferably, however, the catalysts are prepared in such a way that a suitable carrier material is first impregnated or coated with the vanadium component or the vanadium and phosphorus components, respectively, in the form of aqueous solutions of the free acids or of salts which can easily be decomposed, such as ammonium vanadate and phosphoric acid, after which the antimony component in the form of an aqueous solution of a salt of an acid which can easily be volatilized, e.g. antimony chloride, is gradually added in the desired amount. Thereafter, if desired, the bismuth component may also be added in the form of an aqueous solution of a salt of an acid which can easily be volatilized, such as bismuth nitrate. The resulting products may then be brought into the catalytically active form by drying and heating at a temperature between about 400 and 600° C.

All sorts of materials, such as finely divided silica gel, for instance in the form of the commercial product "Aerosil," clay, pumice stone, aluminum phosphate, aluminum oxide, boron phosphate and the like can be used as the carrier material. The use of Carborundum as the carrier material offers special advantages, as will be set forth below. The catalytically active components may be applied to the carrier material in any desired ratio, for instance, in ratios varying from 5 to 60% by weight of the carrier material. In addition to the abovementioned oxides the catalyst may, if desired, also contain smaller amounts of oxides of other substances, for instance, the oxides of titanium, manganese, iron, cobalt, nickel, zinc, cadmium, lead, chromium and arsenic.

The process according to the invention is by preference carried out by passing a mixture of propene or isobutene and an oxygen-containing gas, desirably air, and with or without an inert gas or vapor, preferably steam through a fixed bed of the catalyst mass. However, it may also be advantageous to have the oxidation take place in a fluidized catalyst bed. When catalysts containing Carborundum are used as the carrier material, the addition of steam as inert diluting gas may generally be avoided, and an oxygen-containing gas mixture with an oxygen content higher than that of air may be employed as the oxidation gas. This permits the use of a more compact installation and raises the daily output per unit volume of catalyst.

The ratio between the alkene and oxygen may be varied within wide limits in the oxidation. If air is used as oxidation gas, the amount should preferably be such that 0.1 to 1.0 mol. of oxygen per mol. of alkene is present in the gas mixture. However, it may also be advantageous to use less than 0.1 mol. or more than 1.0 mol. of oxygen per mol. of alkene. The amount of inert gas or vapor which may furthermore be added to the reaction mixture may also be varied widely. For instance, when using a Carborundum-free catalyst, the use of air as the oxidation gas gives good results if steam is entrained in amounts varying from 0.5 to 15 moles per mol. of alkene.

Suitable temperatures for carrying out the oxidation are generally in the range of 300° to 800° C. However, the process is preferably carried out at a temperature of about 400 to 550° C. By preference, the reaction is carried out at normal pressure although higher or lower pressures may also be used.

The rate at which the gas mixture is passed through the catalyst bed may also be varied between very wide limits. For example, the rate may be in the range of 100 to 10,000 liters of gas mixture per liter of catalyst mass per hour although lower or higher flow rates may also be applied. In general, the degree of conversion into acrolein or methacrolein will be lower and the yield higher if the flow rate is high, and conversely, the degree of conversion will be higher and the yield lower if the flow rate is low.

After the acrolein or methacrolein, and any acetaldehyde, or methacrylic acid respectively, have been separated from the issuing gas mixture and any by-products, such as carbon monoxide and carbon dioxide, have been removed according to known processes, the non-converted alkene can be returned to the reaction zone.

The process according to the invention is further illustrated, but not limited, by the following examples:

*Example 1*

A catalyst comprising mixtures and/or compounds of oxides of antimony, vanadium, and phosphorus in an atomic ratio of antimony to the sum of vanadium and phosphorus=0.5, and of vanadium to phosphorus=3.0 and, therefore, corresponding to the composition $Sb(VO_3)_3+SbPO_4$, was prepared by first adding an amount of 85% phosphoric acid to a well-stirred, approximately 12% suspension of "Aerosil" in water and thereafter adding the calculated amount of ammonium vanadate as an approximately 5% by weight solution in hot water. After approximately 2.5 hours, the calculated amount of antimony chloride was slowly added in the form of a concentrated aqueous solution which also contains about 50% by volume of concentrated hydrochloric acid. The product obtained in this way was then stirred for 18 hours at room temperature, evaporated on the steam bath, dried in a drying stove at 120° C., and finally heated at a temperature of 500–510° C. for 18 hours.

Approximately 50 ml. of the catalyst prepared in this way was introduced into a reactor in the form of lumps, and through this fixed catalyst bed a gas mixture consisting of 20% by volume of propene, 20% by volume of air, and 60% by volume of steam was passed. The flow rate of the gas mixture was 7000 liters per liter of catalyst per hour and the reactor was kept at a temperature of 400° C. The acrolein, acetaldehyde, carbon monoxide and carbon dioxide contents of the gas mixture issuing from the reactor were determined analytically.

From the results of the analysis, it appears that 4.6 mol. percent of propene were converted to acrolein, 0.2 mol. percent to acetaldehyde and 3.2 mol. percent to $(CO+CO_2)$. The yield of acrolein calculated on the amount of converted propene amounted to 57.5 mol. percent. In this way, a daily production of 3.6 kg. of acrolein per liter of catalyst could be obtained.

In a similar test in which a gas mixture consisting of 25% by volume of propene, 25% by volume of air and 50% by volume of steam was passed through at a rate of 5600 liters per liter of catalyst per hour, 4.1 mol. percent of propene was converted to acrolein, 0.6 mol. percent to acetaldehyde and 3.2 mol. percent to $(CO+CO_2)$. In this case, the yield of acrolein was 51.9% and the daily production amounted to 3.2 kg. per liter of catalyst.

*Example 2*

Through a fixed catalyst bed of 50 ml. of the catalyst prepared in the manner described in Example 1, a gas mixture consisting of 20% by volume of isobutene, 20% by volume of air, and 60% by volume of steam was passed. The flow rate of the gas mixture amounted to 7000 liters per liter of catalyst per hour, and the reactor was kept at a temperature of 400° C. The methacrolein, methacrylic acid, carbon monoxide and carbon dioxide contents of the gas mixture issuing from the reactor were determined analytically.

From the results of the analysis it appeared that 2.6 mol. percent of isobutene was converted to methacrolein, 1.1 mol. percent to methacrylic acid and 3.0 mol. percent to $(CO+CO_2)$. The yield of methacrolein calculated on the amount of converted isobutene amounted to 38.8 mol. percent. Consequently, a daily production of 2.5 kg. per liter of catalyst was obtained in this way.

*Example 3*

A catalyst containing mixtures and/or compounds of oxides of antimony, bismuth, vanadium, and phosphorus in an atomic ratio of antimony to bismuth=1.0, of the sum of antimony and bismuth to the sum of vanadium and phosphorus=1, and of vanadium to phosphorus=3.0, (thus corresponding to the composition

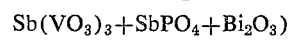

$Sb(VO_3)_3+SbPO_4+Bi_2O_3$)

was prepared in the manner described in Example 1, with the difference, however, that after the antimony chloride solution had been added to the suspension, the calculated amount of bismuth nitrate was also added, at a slow rate, in the form of a concentrated aqueous solution which also contained about 15% by volume of 60% nitric acid.

Approximately 50 ml. of this catalyst was introduced into a reactor in the form of lumps and through this fixed catalyst bed a gas mixture consisting of 20% by volume of propene, 20% by volume of air, and 60% by volume of steam was passed. The flow rate amounted to 7000 liters per liter of catalyst and the reactor was kept at a temperature of 400° C. From the results of the analysis of the issuing gas mixture it appeared that 6.5 mol percent of propene was converted to acrolein, 0.0 mol. percent to acetaldehyde, and 2.6 mol. percent to $(CO+CO_2)$. The yield of acrolein calculated on the amount of converted propene amounted to 71.4 mol. percent and the daily production obtained in this way was 5.1 kg. per liter of catalyst.

In a similar test, in which a gas mixture consisting of 25% by volume of propene, 25% by volume of air, and 50% by volume of steam was passed through at the rate of 5600 liters per liter of catalyst per hour and the reactor was kept at a temperature of 425° C., 6.7 mol. percent of propene was converted to acrolein, 0.0 mol. percent to acetaldehyde, and 3.0 mol. percent to $(CO+CO_2)$. In this case the yield of acrolein was 69.1 mol. percent and the daily production amounted to 5.3 kg. per liter of catalyst.

*Example 4*

Through a fixed catalyst bed of 50 ml. of the catalyst prepared in the manner described in Example 3, a gas mixture consisting of 20% by volume of isobutene, 20% by volume of air, and 60% by volume of steam was passed. The flow rate amounted to 7000 liters per liter of catalyst per hour and the reactor was kept at a temperature of 400° C. From the results of the analysis it appeared that 9.9 mol. percent of isobutene was converted to methacrolein, 0.7 mol. percent to methacrylic acid and 1.7 mol. percent to ($CO+CO_2$). In this example, the yield of methacrolein calculated on the amount of converted isobutene was 80.5 mol. percent and the daily production was 9.7 kg. per liter of catalyst.

In a similar test, in which the reactor was kept at a temperature of 450° C., 6.1 mol. percent of isobutene was converted to methacrolein, 0.2 mol. percent to methacrylic acid, and 2.3 mol. percent to ($CO+CO_2$). In this case the yield of methacrolein was 70.9 mol. percent and the daily production amounted to 6.0 kg. per liter of catalyst.

*Example 5*

A catalyst containing mixtures and/or compounds of oxides of antimony, bismuth, vanadium and phosphorus in an atomic ratio of antimony to bismuth=1.0, of the sum of antimony and bismuth to the sum of vanadium and phosphorus=1.0, and of vanadium to phosphorus=3.0, (thus corresponding to the composition

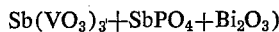

was prepared by bringing an amount of Carborundum, in the form of lumps varying in size between 3 and 5 mm., into a hot, approximately 7% by weight aqueous solution of ammonium vanadate to which also the calculated amount of phosphoric acid had been added, evaporating the suspension on a steam bath with simultaneous stirring, subsequently adding the calculated amount of antimony chloride in the form of a concentrated aqueous solution which contains also about 50% by volume of concentrated hydrochloric acid, evaporating the mixture, adding the calculated amount of bismuth nitrate in the form of a concentrated aqueous solution which contains also about 15% by volume of cencentrated nitric acid and finally, after evaporation, drying the resulting mass at 100° C. and heating it for 16 hours at a temperature of approximately 500° C. The catalyst thus obtained contained 24% by weight of the abovementioned oxides.

Through a fixed bed of about 50 ml. of the above catalyst, a gas mixture consisting of isobutene, air and oxygen was passed under normal pressure and at such a rate that 2800 liters of isobutene, 2000 liters of air and 400 liters of oxygen were led through hourly. The reactor was kept at a temperature of 475° C.

Analysis of the gas mixture issuing from the reactor showed that 8.1 mol. percent of the isobutene had been converted to methacrolein and that the yield of methacrolein in relation to the amount of converted isobutene was 77.9 mol. percent. The daily output of methacrolein consequently amounted to 16.4 kg. per liter of catalyst.

In a test in which a propene-air-oxygen mixture was led over the same catalyst at an hourly rate of 2800 liters of propene, 2000 liters of air and 400 liters of oxygen per liter of catalyst, 3.1 mol. percent of propene was converted to acrolein, the yield of acrolein in relation to converted propene being 59 mol. percent. The daily output of acrolein amounted to 5.0 kg. per liter of catalyst.

In the foregoing examples, the propene or isobutene used as starting material was substantially pure. These olefins in pure form may be obtained in conventional fashion, for example, by fractionating the mixture of lower-boiling hydrocarbons (B.P. —50 to +50° C.) obtained in the thermal and/or catalytic cracking of mineral oil fractions, into fractions which consist essentially of hydrocarbons having the same number of C atoms. Thus a "$C_4$ fraction" obtained in this way principally contains, in addition to from about 10 to 50 percent isobutene;
10 to 35 percent butene-1;
5 to 50 percent cis- and trans-butene-2;
0.1 to 35 percent butadiene;
0.5 to 35 percent n-butane; and
0.5 to 35 percent isobutane, by volume. The recovery of pure isobutene from such a fraction requires an additional separation, which is a rather costly operation, and it has been found that in at least the preparation of methacrolein according to the process described herein, this separation step may be omitted. In other words, it is not necessary to start from pure isobutene when methacrolein is the desired product and the starting product may be the "$C_4$ fraction" referred to above. It appears that under the circumstances of the present process, the oxidation of isobutene to methacrolein is not adversely affected by the presence of the other $C_4$ hydrocarbons. The other $C_4$ hydrocarbons are apparently oxidized to aldehydes or acids only to a very low degree and it is another advantage that, under the conditions of the present invention, a part of the butenes present is in most cases dehydrogenated to butadiene, the latter being itself a highly desirable product. Thus, the use of the "$C_4$ fraction" or impure isobutene in the preparation of methacrolein offers the advantages of giving a valuable by-product in addition to obviating the necessity for separating the isobutene from the other $C_4$ hydrocarbons.

The process using impure isobutene, i.e. a $C_4$ hydrocarbon fraction, for the preparation of methacrolein, is illustrated below.

*Example 6*

Comparative experiments were carried out with hydrocarbon fractions consisting essentially of hydrocarbons containing four C atoms in varying ratios using a fixed bed of 50 ml. of a catalyst containing mixtures and/or compounds of oxides of antimony, bismuth, vanadium, and phosphorus in the following atomic ratios: antimony to bismuth=1.0, sum of antimony and bismuth to sum of vanadium and phosphorus=1.0, vanadium to phosphorus=3.0 (corresponding to the composition

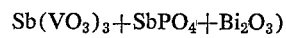

The catalyst also included Carborundum as the carrier material and the amount of the indicated oxides in the catalyst was 24% by weight.

A hydrocarbon fraction containing, by volume, 46% isobutene, 25% butene-1, 10.5% trans-butene-2, 8% cis-butene-2, 1% butadiene and 9.5% (butane+isobutane) was passed together with air and steam, through the catalyst bed at normal pressure and at such a rate that 700 liters of the $C_4$ fraction, 2100 liters of air, and 350 liters of steam were passed through per 1 liter of catalyst per hour. The reactor temperature was maintained at 500° C. Analysis of the gas mixture issuing from the reactor showed the degree of conversion of the $C_4$ fraction to methacrolein to be 15.6 mol percent, and the yield of methacrolein on the basis of isobutene converted to be 70 mol percent. This means that, on a daily basis, the production of methacrolein would amount to 7.6 kg. per liter of catalyst. In addition, butadiene was formed with a yield of 42 mol percent based on the amount of butenes converted.

In another experiment, a hydrocarbon fraction containing, by volume, 35% isobutene, 19.5% butene-1, 9.5% trans-butene-2, 7.5% cis-butene-2, 23.5% butadiene, and 5% (butane+isobutane), was passed through the same catalyst at such a rate that per hour 2800 liters of this fraction and 3500 liters of air were passed through per liter of catalyst. The reactor temperature was maintained at 475° C. 6.0 mol percent of the $C_4$ fraction was converted to methacrolein, the yield being 72 mol percent with respect to the amount of isobutene converted. Consequently, the daily production of methacrolein was 11.8 kg. per liter of catalyst and the amount of butadiene contained in the mixture issuing from the reactor was virtually equal to the amount contained in the mixture fed in.

It will be appreciated that various modifications may be made in the invention as described above without de-

We claim:

1. In a process for preparing a member of the group consisting of acrolein and methacrolein by the gas phase oxidation of an alkene selected from the group consisting of propene and isobutene, with oxygen at elevated temperature and in the presence of an antimony catalyst, the step which comprises utilizing as the catalyst, one selected from the group consisting of mixtures and compounds comprising antimony and vanadium oxides, the atomic ratio between the antimony and vanadium being at least 0.5 but no greater than 1.5.

2. The process of claim 1 wherein said catalyst also includes a member of the group consisting of bismuth oxide and compounds derived therefrom.

3. The process of claim 1 wherein said catalyst includes Carborundum as a carrier material.

4. The process of claim 1 wherein a hydrocarbon fraction consisting essentially of isobutene and other $C_4$ hydrocarbons is used as the starting material to prepare methacrolein.

5. The process of claim 1 wherein the catalyst comprises a mixture of oxides of antimony, vanadium, phosphorus and bismuth, the atomic ratio between the sum of the antimony and bismuth and the sum of the vanadium and phosphorus in said catalyst being at least 0.5 and no greater than 1.5, and the atomic ratio between the vanadium and phosphorus in said catalyst being at least 3.

6. In a process for preparing a member of the group consisting of acrolein and methacrolein by the gas phase oxidation of an alkene selected from the group consisting of propene and isobutene in the presence of an antimony catalyst, the improvement which comprises utilizing as the catalyst, one selected from the group consisting of mixtures and compounds comprising antimony and vanadium oxides, the atomic ratio between the antimony and vanadium being at least 0.5 but no greater than 1.5, and contacting said catalyst with a gaseous mixture containing said alkene and oxygen in the ratio of about 0.1 to about 1.0 mol. of oxygen per mol. of said alkene at a temperature in the range of about 300 to about 800° C.

7. The process of claim 6 including from about 0.5 to about 15 moles of steam per mol. of alkene in said gaseous mixture.

8. The process of claim 6 wherein said gaseous mixture is supplied at a rate ranging from about 100 to about 10,000 liters of gaseous mixture per liter of catalyst mass per hour.

9. The process of claim 6 wherein the temperature is in the range of about 400 to about 550° C.

References Cited by the Examiner

UNITED STATES PATENTS 2,941,007  6/1960  Callahan et al. _____ 260—604

FOREIGN PATENTS 588,908  12/1959  Canada.
136,728  6/1960  Russia.
864,666  4/1961  Great Britain.

OTHER REFERENCES

Derwent: Belgian Patent Report NO 82 B, issued Dec. 22, 1961, page A 14 (patent issued June 28, 1961) (copies in Library).

BERNARD HELFIN, *Acting Primary Examiner.*

L. ZITVER, *Examiner.*

J. J. SETELIK, *Assistant Examiner.*